(12) United States Patent
Kitano et al.

(10) Patent No.: US 6,660,399 B1
(45) Date of Patent: *Dec. 9, 2003

(54) COMPOSITION FOR ROLLER AND ROLLER THEREFROM

(75) Inventors: Kenichi Kitano, Kobe (JP); Yoshiki Nakagawa, Kobe (JP)

(73) Assignee: Kaneka Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 138 days.

(21) Appl. No.: 09/763,190

(22) PCT Filed: Aug. 20, 1999

(86) PCT No.: PCT/JP99/04469

§ 371 (c)(1),
(2), (4) Date: Apr. 19, 2001

(87) PCT Pub. No.: WO00/11082

PCT Pub. Date: Mar. 2, 2000

(30) Foreign Application Priority Data

Aug. 20, 1998 (JP) .............................. 10-234433
Aug. 27, 1998 (JP) .............................. 10-242100

(51) Int. Cl.⁷ .................. B32B 27/00; G03G 13/14
(52) U.S. Cl. .................. 428/500; 430/126; 492/56; 399/398
(58) Field of Search .................. 428/500; 430/126; 492/56; 399/398

(56) References Cited

U.S. PATENT DOCUMENTS

| | | |
|---|---|---|
| 5,763,548 A | 6/1998 | Matyjaszewski et al. |
| 5,789,487 A | 8/1998 | Matyjaszewski et al. |
| 5,807,937 A | 9/1998 | Matyjaszewski et al. |

FOREIGN PATENT DOCUMENTS

| | | |
|---|---|---|
| EP | 0789036 A2 | 8/1997 |
| EP | 0816385 A1 | 1/1998 |
| JP | 9-96944 | * 4/1997 |
| WO | WO 96/30421 | 10/1996 |
| WO | WO 97/18247 | 5/1997 |
| WO | WO 98/01480 | 1/1998 |
| WO | WO 98/40415 | 9/1998 |

* cited by examiner

*Primary Examiner*—Mark A. Chapman
(74) *Attorney, Agent, or Firm*—Connolly Bove Lodge & Hutz LLP

(57) ABSTRACT

A composition for roller for an electronic copying machine or printer
  which comprises a vinyl polymer (A) having at least one alkenyl group per molecule,
  and a roller as fabricated using said composition for roller.

The present invention provides a composition for roller for an electronic copying machine or printer with which an alcohol-soluble nylon layer can be directly constructed on the roller without a primer or other pretreatment.

28 Claims, 1 Drawing Sheet

COMPOSITION FOR ROLLER AND ROLLER THEREFROM

TECHNICAL FIELD

The present invention relates to a composition for roller for the production of rollers or paper feed which can be used in contact with the photoreceptor in an electronic copying machine or printer which performs copying or printing electrostatically and to rollers fabricated using the composition.

BACKGROUND ART

The operating principle of an electronic copying machine, for instance, is such that a toner is electrostatically deposited on a photoreceptor for the formation of an electrostatic latent image true to an original, the toner image is then transferred to a sheet of paper fed to the system, and finally the toner pattern on the paper is fixed by thermal fusion to provide a hard copy of the original.

Thus, the above electronic copying machine performs copying in the process sequence of charging, exposure, development, transfer, fixing, cleaning, and erase, and to execute the above sequence, a variety of rollers are disposed either in contact with the photoreceptor or around and certain distances apart from the photoreceptor. For the manufacture of such rollers, an electrically conductive polyurethane foam, chloroprene rubber or EP rubber have so far been used in many instances.

However, the rollers for the charging, development, transfer and cleaning steps, in particular, are often used in contact with the photoreceptor and when rollers made of the above-mentioned materials are used for these steps, the unreacted monomer, oligomer and other non-reactive additives contained in the rollers are transferred to the photoreceptor to contaminate it so that the quality of the image is sacrificed.

To overcome the above trouble, the surface of the roller is usually coated with a nylon material or covered with a heat-shrinkable tube.

Furthermore, in order to control the resistivity of the roller, the surface of the roller is similarly coated with a semiconductor material.

However, since the conventional roller cannot be provided with a sufficient degree of adhesion by such surface coating, it is common practice to treat the roller surface with a primer or cover the surface with an electrically conductive, highly adhesive material, e.g. epichlorohydrin rubber, in advance. However, the interposition of an adhesive layer between the electrically conductive roller and the surface coating layer or heat-shrinkable tubing tends to cause variation in roller characteristics and, as an additional disadvantage, increases the cost of production.

In view of the above state of the art, the present invention has for its object to provide a composition for roller for an electronic copying machine or printer with which an alcohol-soluble nylon layer can be directly constructed on the roller without a primer or other pretreatment.

SUMMARY OF THE INVENTION

The present invention, therefore, is directed to a composition for roller for an electronic copying machine or printer
which comprises a vinyl polymer (A) having at least one alkenyl group per molecule.
The present invention is further directed to a roller which is fabricated using said composition for roller.

The present invention is now described in detail.

DETAILED DESCRIPTION OF THE INVENTION

Figure 1:
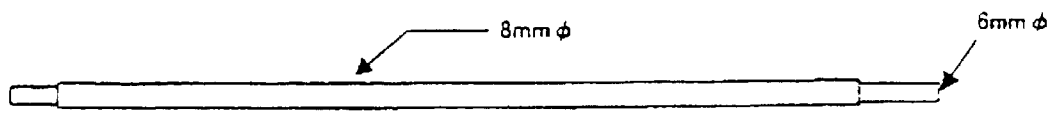
FIG. 1 is a side elevation view of the shaft used for the production of a roller in Examples 1 and 2.
Figure 2:
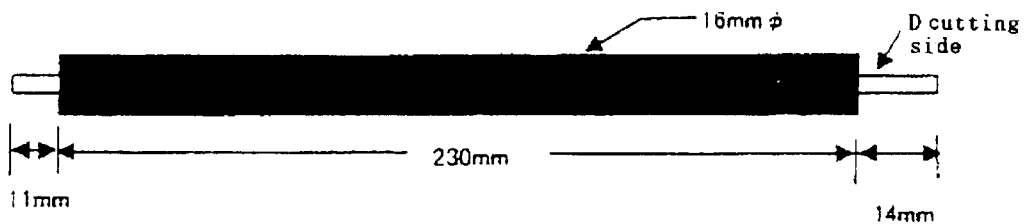
FIG. 2 is a side elevation view of the rollers fabricated in Examples 1 and 2.
Figure 3:
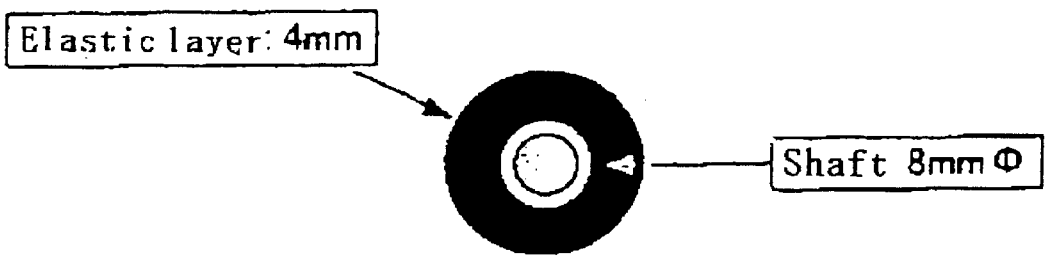
FIG. 3 is a sectional elevation view of the rollers fabricated in Examples 1 and 2.

In the composition for roller of the present invention, a vinyl polymer (A) containing at least one alkenyl group per molecule is employed.

While at least one of alkenyl groups in said vinyl polymer (A) is required, preferred number per molecule is 1.1 to 4 on the average. Although the alkenyl group may be located in any of a side chain and a terminus of the molecule, it is preferably located terminally in order that good rubber-like elasticity may be provided.

While the main chain of said vinyl polymer (A) comprises a vinyl polymer, the monomer for constituting the main chain is not particularly restricted but may be chosen from a wide range of compounds. Thus, such compounds include (meth)acrylic monomers, such as (meth)acrylic acid, methyl (meth)acrylate, ethyl (meth)acrylate, n-propyl (meth) acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth) acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth) acrylate, tolyl (meth)acrylate, benzyl (meth)acrylate, 2-methoxyethyl (meth)acrylate, 3-methoxypropyl (meth) acrylate, 2-hydroxyethyl (meth) acrylate, 2-hydroxypropyl (meth)acrylate, stearyl (meth)acrylate, glycidyl (meth) acrylate, 2-aminoethyl (meth)acrylate, γ-(methacryloyloxypropyl)trimethoxysilane, (meth)acrylic acid-ethylene oxide adduct, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl. (meth) acrylate, 2-perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, etc.; styrenic monomers such as styrene, vinyltoluene, α-methylstyrene, chlorostyrene, styrenesulfonic acid and its salt, etc.; fluorine-containing vinyl monomers such as perfluoroethylene, perfluoropropylene, vinylidene fluoride, etc.; silicon-containing vinyl monomers such as vinyltrichlorosilane, vinylmethyldichlorosilane, vinyldimethylchlorosilane, vinylmethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, γ-methacryloyloxypropylmethyldimethoxysilane, etc.; maleic anhydride, maleic acid, and monoalkyl and dialkyl esters of maleic acid; fumaric acid and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide, etc.; nitrile-containing vinyl monomers such as acrylonitrile, methacrylonitrile, etc.; amido-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride and allyl alcohol, among others. These may be used independently or a plurality of them may be copolymerized. In the nomenclature used above, (meth)acrylic acid, for instance, means acrylic acid and/or methacrylic acid.

Among species of the vinyl polymer (A) having at least one alkenyl group per molecule, particularly among those derived from the monomers mentioned above, the (meth)acrylic polymer synthesized using 40 weight % or more of a (meth)acrylic monomer is preferred from the standpoint of the physical properties. As such (meth)acrylic monomer, (meth)acrylate ester monomers are preferred and acrylate ester monomers are still more preferred. The main chain synthesized by polymerizing a styrenic monomer is also useful.

The number average molecular weight of said vinyl polymer (A) having at least one alkenyl group is not particularly restricted but is preferably within the range of 500 to 100000, more preferably 3000 to 40000. When the molecular weight is not more than 500, the intrinsic characteristics of vinyl polymers cannot be fully expressed. When it is over 100000, the polymer is not easy to handle.

The molecular weight distribution, namely the ratio (Mw/Mn) of weight average molecular weight (Mw) to number average molecular weight (Mn) as determined by gel permeation chromatography, of said vinyl polymer (A) having at least one alkenyl group is not particularly restricted. However, in order that the viscosity of a composition for roller may be depressed so as to improve workability and to provide sufficient cured properties, the molecular weight distribution profile is preferably narrow. The distribution (Mw/Mn) value is preferably less than 1.8, more preferably not more than 1.7, still more preferably not more than 1.6, further more preferably not more than 1.5, still further more preferably not more than 1.4, and particularly preferably not more than 1.3.

The vinyl polymer (A) having at least one alkenyl group can be synthesized by various polymerization techniques, with no particular restriction. However, in the universality of monomers that can be used and the ease of reaction control, the radical polymerization method is preferred. Thus, it is preferred to directly introduce an alkenyl group by the radical polymerization technique or prepare a vinyl polymer having a certain functional group convertible to an alkenyl group in one or more step in advance and thereafter convert said certain functional group to an alkenyl group.

The radical polymerization method which can be used for synthesizing a vinyl polymer having a given functional group, inclusive of alkenyl, can be divided into the "general radical polymerization method" in which a monomer having a given functional group is simply copolymerized with a vinyl monomer using an azo or peroxide compound as the polymerization initiator and the "controlled radical polymerization method" which is capable of introducing a given functional group into a defined position such as the molecular terminus.

The "general radical polymerization method" is an expedient method and can be used for purposes of the present invention. However, by this method, a monomer having a given functional group is introduced into the product polymer only in probabilities, and in order to synthesize a polymer of high functionality, this monomer must be used in a fairly large amount. When conversely the amount of the monomer is small, the ratio of polymer molecules not provided with the particular functional group is increased. Another disadvantage is that since the reaction is a free radical polymerization reaction, the molecular weight distribution is more or less broadened so that only a polymer having a relatively high viscosity can be obtained.

On the other hand, the "controlled radical polymerization method" can be divided into the "chain transfer agent technique" in which a vinyl polymer having a functional group at the molecular terminus is formed by carrying out the polymerization using a chain transfer agent having a given functional group, and the "living radical polymerization technique" in which the growing chain termini are constantly kept active, i.e. without being interrupted by a termination reaction, to give a polymer approximating the designed molecular weight.

The "chain transfer agent technique" is capable of giving a polymer of high functionality and can be used in the present invention but a chain transfer agent having a given functional group must be used in a fairly large amount relative to the initiator, with the consequent disadvantage in economics inclusive of the cost of treatment involved. Since it is also a free radical polymerization method as is said "general radical polymerization method", there is a further disadvantage that any polymer as obtainable has a broad molecular weight distribution and a high viscosity.

Unlike the above polymerization technology, the "living radical polymerization technique" is advantageous in that despite its also being a method for radical polymerization reaction which is generally considered to be hardly controllable because of the high velocity of polymerization and high incidence of a termination reaction by radical-radical coupling or the like, a termination reaction does not easily take place, thus giving a polymer with a narrow molecular weight distribution (Mw/Mn=about 1.1 to 1.5), and further in that the molecular weight can be freely controlled by adjusting the monomer-initiator charge ratio.

Since "living radical polymerization" is thus capable of giving a polymer having a narrow molecular weight distribution profile and a low viscosity and enables introduction of a monomer having a given functional group in a more or less planned position, it is a further preferred method for producing said vinyl polymer having a certain functional group according to the present invention.

In a narrow sense of the term, "living polymerization" means a polymerization in which the molecule chain grows with its growth being constantly activated. Generally, however, the term is used to broadly cover as well a pseudo-living polymerization reaction in which the polymer grows while molecules with an activated terminal and molecules with an inactivated terminal are in equilibrium, and the term as used in this specification also has the latter broad meaning.

Recently, "living radical polymerization" has been studied in earnest by many research groups. By way of illustration, this technology includes the method employing a cobalt porphyrin complex as described in J. Am. Chem. Soc., 116, 7943 (1994); the method using a radical scavenger such as a nitroxide compound as described in Macromolecules, 27, 7228 (1994), and the atom transfer radical polymerization (ATRP) method using an organohalogen compound as the initiator and a transition metal complex as the catalyst.

Among such versions of the "living radical polymerization method", the "atom transfer radical polymerization" method in which a vinyl monomer is polymerized using an organohalogen compound or a sulfonyl halide compound as the initiator and a transition metal complex as the catalyst is still more preferred for the production of said vinyl polymer having a given functional group because, in addition to the above-mentioned advantages of "living radical polymerization", it is capable of giving a polymer terminating in a halogen atom or the like, which is comparatively favorable for a functional group exchange reaction, and offers a broad freedom in the initiator and catalyst design. Regarding this atom transfer radical polymerization method, reference can be made to Matyjaszewski et al.: J. Am. Chem. Soc., 117, 5614 (1995), Macromolecules, 28, 7901 (1995), Science, 272, 866 (1996), WO 96/30421, WO 97/18247, and Sawamoto et al.: Macromolecules, 28, 1721 (1995), among others.

The initiator for use in the present polymerization is not particularly restricted but includes, for example, organohalogen compounds, particularly activated organohalogen compounds (e.g. ester compounds having a halogen atom in the α-position and compounds having a halogen atom in the benzyl moiety), and halogenated sulfonyl compounds. Using such a compound as the initiator, a halogen-terminated vinyl polymer can be obtained. By converting this terminal halogen in the manner described below, an alkenyl-terminated vinyl polymer can be obtained. The following are some examples of said initiator. $C_6H_5$—$CH_2X$, $C_6H_5$—$C(H)(X)CH_3$, $C_6H_5$—$C(X)(CH_3)_2$ (wherein $C_6H_5$ represents a phenyl group; X represents chloro, bromo or iodo); $R^3$—$C(H)(X)$—$CO_2R^4$, $R^3$—$C(CH_3)(X)$—$CO_2R^4$, $R^3$—$C(H)(X)$—$C(O)R^4$, $R^3$—$C(CH_3)(X)$—$C(O)R^4$ (wherein $R^3$ and $R^4$ may be the same or different and each represents hydrogen, an alkyl group of 1 to 20 carbon atoms, an aryl group of 6 to 20 carbon atoms or an aralkyl group of 7 to 20 carbon atoms; X represents chloro, bromo or iodo); $R^3$—$C_6H_4$—$SO_2X$ (wherein $R^3$ represents hydrogen, an alkyl group of 1 to 20 carbon atoms, an aryl group of 6 to 20 carbon atoms or an aralkyl group of 7 to 20 carbon atoms; X represents chloro, bromo or iodo).

As the initiator, it is also possible to use an organohalogen compound or halogenated sulfonyl compound having a functional group other than the functional group taking charge of initiation of polymerization. In this case, a polymer as obtainable has said functional group of the initiator at one of the main chain termini and a halogen atom at the other terminus. Examples of said functional group include alkenyl, crosslinkable silyl, hydroxyl, epoxy, amino, amido and carboxyl.

The organohalogen compound having an alkenyl group is not particularly restricted but includes compounds having the structure represented by the general formula (3), among others.

$$R^5R^6C(X)—R^7—R^8—C(R^2)=CH_2 \tag{3}$$

(wherein $R^2$ represents hydrogen or a methyl group; $R^5$ and $R^6$ each represents hydrogen or a monovalent hydrocarbon group, i.e. an alkyl group of 1 to 20 carbon atoms, an aryl group of 6 to 20 carbon atoms or an aralkyl group of 7 to 20 carbon atoms, or $R^5$ and $R^6$ may be jointed to each other; $R^7$ represents —C(O)O— (ester group), —C(O)— (keto group), or an o-, m- or p-phenylene group; $R^8$ represents a direct bond or a divalent organic group of 1 to 20 carbon atoms which may optionally contain one or more ether linkages; X represents chloro, bromo or iodo).

Specifically, $R^5$ and $R^6$ each includes hydrogen, methyl, ethyl, n-propyl, isopropyl, butyl, pentyl and hexyl, among others. $R^5$ and $R^6$ may be jointed to each other through their other ends to form a cyclic structure.

As the organohalogen compound having an alkenyl group, compounds of the following general formula (4) can be further mentioned.

$$H_2C=C(R^2)—R^8—C(R^5)(X)—R^9—R^6 \tag{4}$$

(wherein $R^2$, $R^5$, $R^6$ and $R^8$ are as defined above; $R^9$ represents a direct bond, —C(O)O— (ester group), —C(O)— (keto group), or an o-, m- or p-phenylene group; X is as defined above).

$R^8$ represents either a direct bond or a divalent organic group of 1 to 20 carbon atoms (optionally containing 1 or more ether linkages). However, when it is a direct bond, the vinyl group is attached to the carbon to which the halogen is attached, thus forming an allyl halide. Since, in this case, the carbon-halogen bond has been activated by the adjacent vinyl group, $R^9$ need not necessarily be a C(O)O group or a phenylene group but may be a direct bond. When $R^8$ is not a direct bond, $R^9$ is preferably a C(O)O group, a C(O) group or a phenylene group in order that the carbon-halogen bond may be activated.

The halogenated sulfonyl compound having an alkenyl group includes the following, among others.

o-, m- or p-$CH_2=CH—(CH_2)_n—C_6H_4—SO_2X$, o-, m- or p-$CH_2=CH—(CH_2)_n—O—C_6H_4—SO_2X$, (in each formula, X represents chloro, bromo or iodo; n represents an integer of 0 to 20).

The organohalogen compound having a crosslinkable silyl group is not particularly restricted but includes compounds having the structure represented by the following general formula (5), among others.

$$R^5R^6C(X)—R^7—R^8—C(H)(R^2)CH_2—[Si(R^{10})_{2-b}(Y)_bO]_m—Si(R^{11})_{3-a}(Y)_a \tag{5}$$

(wherein $R^2$, $R^5$, $R^6$, $R^7$, $R^8$ and X are as defined above; $R^{10}$ and $R^{11}$ each represents an alkyl group of 1 to 20 carbon atoms, an aryl group of 6 to 20 carbon atoms, an aralkyl group of 7 to 20 carbon atoms, or a triorganosiloxy group of the formula $R'_3SiO$— ($R'$ represents a monovalent hydrocarbon group of 1 to 20 carbon atoms and the 3 $R'$ groups maybe the same or different); when 2 or more $R^{10}$ or $R^{11}$ groups are present, they may be the same or different; Y represents a hydroxyl group or a hydrolyzable group and when two or more Y groups exist, they may be the same or different; a is equal to 0, 1, 2 or 3; b is equal to 0, 1 or 2; m represents an integer of 0 to 19; provided, however, that the condition of a+mb≧1 is satisfied).

The organohalogen compound having a crosslinkable silyl group further includes compounds having the structure represented by the following general formula (6).

$$(R^{11})_{3-a}(Y)_aSi—[OSi(R^{10})_{2-b}(Y)_b]_m—CH_2—C(H)(R^2)—R^8—C(R^5)(X)—R^9—R^6 \tag{6}$$

(wherein $R^5$, $R^6$, $R^8$, $R^9$, $R^{10}$, $R^{11}$, a, b, m, X and Y are as defined above).

The organohalogen compound or halogenated sulfonyl compound having a hydroxyl group is not particularly restricted but includes compounds of the following formula:

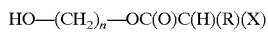

(wherein X represents chloro, bromo or iodo; R represents hydrogen, an alkyl group of 1 to 20 carbon atoms, an aryl group of 6 to 20 carbon atoms or an aralkyl group of 7 to 20 carbon atoms; n represents an integer of 1 to 20).

The organohalogen compound or halogenated sulfonyl compound having an amino group is not particularly restricted but includes compounds of the following formula.

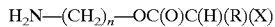

(wherein X represents chloro, bromo or iodo; R represents hydrogen, an alkyl group of 1 to 20 carbon atoms, an aryl group of 6 to 20 carbon atoms or an aralkyl group of 7 to 20 carbon atoms; n represents an integer of 1 to 20).

The organohalogen compound or halogenated sulfonyl compound having an epoxy group is not particularly restricted but includes compounds of the following formula:

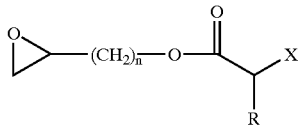

(wherein X represents chloro, bromo or iodo; R represents hydrogen, an alkyl group of 1 to 20 carbon atoms, an aryl group of 6 to 20 carbon atoms or an aralkyl group of 7 to 20 carbon atoms; n represents an integer of 1 to 20).

Furthermore, the polymerization reaction may be carried out using an organohalogen compound or sulfonyl halide compound having 2 or more initiation points as the initiator. In such a case, a vinyl polymer having 2 or more halogen atoms per molecule can be obtained.

The initiator having 2 or more initiation sites include but is not limited to the following compounds.

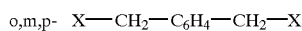 (i-1)

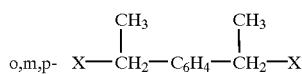 (i-2)

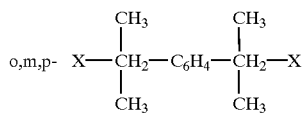 (i-3)

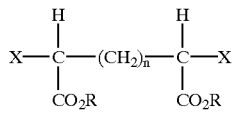 (i-4)

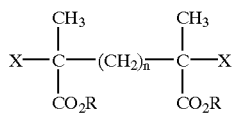 (i-5)

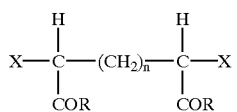 (i-6)

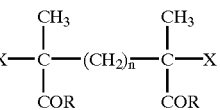 (i-7)

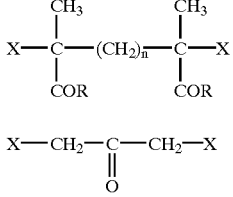 (i-8)

(i-9)

(i-10)

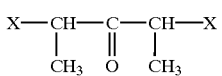 (i-11)

(Referring to the above formulas, $C_6H_4$ represents a phenylene group; X represents chloro, bromo or iodo; R represents an alkyl group of 1 to 20 carbon atoms, an aryl group of 6 to 20 carbon atoms or an aralkyl group of 7 to 20 carbon atoms; n represents an integer of 0 to 20);

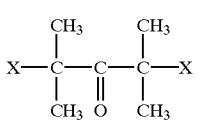 (i-12)

(i-13)

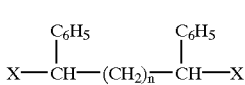 (i-14)

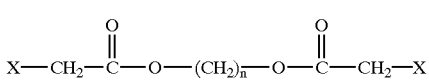 (i-15)

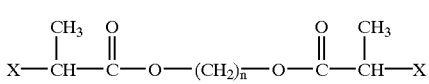 (i-16)

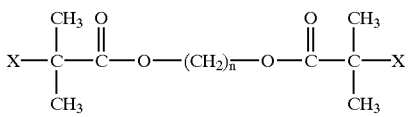 (i-17)

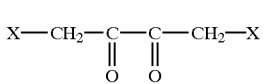 (i-18)

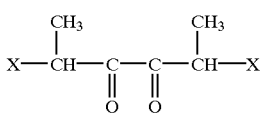 (i-19)

-continued

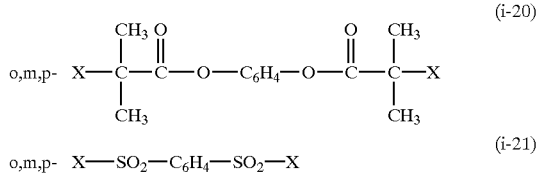

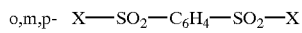

(In the above formulas, X represents chloro, bromo or iodo; n represents an integer of 0 to 20; $C_6H_4$ represents a phenylene group).

The transition metal complex which can be used as the catalyst for said atom transfer radical polymerization includes complex compounds of center metals belonging to Groups 7, 8, 9, 10 and 11 of the Periodic Table of the Elements. As preferred examples, complex compounds of zero-valent copper, monovalent copper, divalent ruthenium, divalent iron or divalent nickel can be mentioned. Among these, preferred are complex compounds of copper. Specific compounds of monovalent copper include cuprous chloride, cuprous bromide, cuprous iodide, cuprous cyanide, cuprous oxide, cuprous perchlorate, and so on. When a copper compound is used, its catalytic activity can be increased by adding, as the ligand, 2,2-bipyridyl and derivatives thereof, 1,10-phenanthroline and derivatives thereof, and a polyamine such as tetramethylethylenediamine, pentamethyldiethylenetriamine, hexamethyltris(2-aminoethyl)amine or the like. The tris(triphenylphosphine) complex of divalent ruthenium chloride ($RuCl_2(PPh_3)_3$) is also suited as the catalyst. When a ruthenium compound is used as the catalyst, an aluminum alkoxide may be added as the activator. Also suited as the catalyst are the bis (triphenylphosphine) complex of divalent iron ($FeCl_2(PPh_3)_2$) bis(triphenylphosphine) complex of divalent nickel ($NiCl_2(PPh_3)_2$), and bis (tributylphosphine) complex of divalent nickel ($NiBr_2(PBu_3)_2$).

The vinyl monomer for use in this polymerization is not particularly restricted but all the monomers mentioned hereinbefore can be used with advantage.

The above polymerization reaction can be conducted in the absence of a solvent or in the presence of a solvent selected from a broad range. The above solvent thus includes hydrocarbon solvents such as benzene, toluene, etc.; ether solvents such as diethyl ether, tetrahydrofuran, diphenyl ether, anisole, dimethoxybenzene, etc.; halogenated hydrocarbon solvents such as methylenechloride, chloroform, chlorobenzene, etc.; ketone solvents such as acetone, methyl ethyl ketone, methyl isobutyl ketone, etc.; alcohol solvents such as methanol, ethanol, propanol, isopropyl alcohol, n-butanol, tert-butyl alcohol, etc.; nitrile solvents such as acetonitrile, propionitrile, benzonitrile, etc.; ester solvents such as ethyl acetate, butyl acetate, etc.; and carbonate solvents such as ethylene carbonate, propylene carbonate, etc.; among others. These can be used independently or two or more of them can be used as a blend. Moreover, the polymerization reaction can be carried out in an emulsion system or a system using supercritical fluid $CO_2$ as the medium.

The polymerization can be carried out within the temperature range of 0 to 200° C., preferably at room temperature to 150° C.

The vinyl polymer (A) having at least one alkenyl group can be prepared by the following procedures, among others without being limited thereto.

(A-a) The method in which, in synthesizing a vinyl polymer by radical polymerization, a compound having both a polymerizable alkenyl group and a sparingly polymerizable alkenyl group within the molecule, which may for example be represented by the following general formula (7), is reacted as a second monomer.

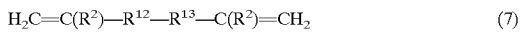

(wherein the two $R^2$ groups may be the same or different and each represents hydrogen or a methyl group; $R^{12}$ represents a group of the formula —C(O)O— or an o-, m- or p-phenylene group; $R^{13}$ represents a direct bond or an organic group of 1 to 20 carbon atoms which may contain one or more ether linkages).

The timing of reacting said compound having both a polymerizable alkenyl group and a sparingly polymerizable alkenyl group within the molecule is not particularly restricted but, when a rubber-like polymer is to be formed by living radical polymerization in particular, this second monomer is preferably reacted at a terminal stage of polymerization or after completion of the reaction of the main monomer.

(A-b) The method in which, in synthesizing a vinyl polymer by living radical polymerization, a compound having at least two sparingly polymerizable alkenyl groups, such as 1,5-hexadiene, 1,7-octadiene and 1,9-decadiene, is reacted at a terminal stage of polymerization or after completion of the reaction of the main monomer.

(A-c) The method which comprises reacting a vinyl polymer having at least one highly reactive carbon-halogen bond with an organometal compound having an alkenyl group, such as allyltributyltin, allyltrioctyltin and the like, to substitute for the halogen.

(A-d) The method which comprises reacting a vinyl polymer having at least one highly reactive carbon-halogen bond with a stabilized carbanion having an alkenyl group, which may for example be represented by the general formula (8), to substitute for the halogen.

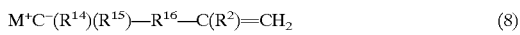

(wherein $R^2$ is as defined above; $R^{14}$ and $R^{15}$ each represents an electron-withdrawing group which stabilizes the carbanion $C^-$ or one of them represents said electron-withdrawing group with the other being hydrogen, a $C_{1-10}$ alkyl group or a phenyl group; $R^{16}$ represents a direct bond or a $C_{1-10}$ divalent organic group which may contain one or more ether linkages; $M^+$ represents an alkali metal ion or a quaternary ammonium ion).

As the electron-withdrawing group for $R^{14}$ and $R^{15}$, a group of the structure represented by the formula —$CO_2R$, —C(O)R or —CN is particularly preferred.

(A-e) The method which comprises permitting an elemental metal, e.g. zinc, or an organometal compound to act upon a vinyl polymer having at least one highly reactive carbon-halogen bond to prepare an enolate anion and, then, reacting it with an electrophilic compound having an alkenyl group, such as an alkenyl-containing compound having a leaving group, e.g. halogen or acetyl, a carbonyl compound having an alkenyl group, an isocyanate compound having an alkenyl group or an acid halide having an alkenyl group.

(A-f) The method which comprises reacting a vinyl polymer having at least one highly reactive carbon-halogen bond with an oxoanion or carboxylate anion having an alkenyl group as represented by the general formula (9) or (10) to substitute for the halogen.

(wherein $R^2$ and $M^+$ are as defined above; $R^{17}$ represents a divalent organic group containing 1 to 20 carbon atoms which may contain one or more ether linkages)

$$H_2C=C(R^2)-R^{18}-C(O)O^-M^+ \quad (10)$$

(wherein $R^2$ and $M^+$ are as defined above; $R^{18}$ represents a direct bond or a divalent organic group containing 1 to 20 carbon atoms which may contain one or more ether linkages).

The method of synthesizing said vinyl polymer having at least one highly reactive carbon-halogen bond is not particularly restricted but includes the following methods, among others: the method which comprises using a halide such as carbon tetrachloride, ethylene chloride, carbon tetrabromide, methylene bromide or the like as the chain transfer agent as described in Japanese Kokai Publication Hei-4-132706 (chain transfer agent method) and the method for radical polymerization of a vinyl monomer which comprises using an organohalogen compound or halogenated sulfonyl compound containing at least one highly reactive carbon-halogen bond as the initiator and a transition metal complex as the catalyst (atom transfer radical polymerization method), among others. The polymers obtainable by the above two methods invariably have a carbon-halogen bond at the molecular terminus and, as such, are suitable for the production of alkenyl-terminated vinyl polymers but in consideration of the ease of control of molecular weight and molecular weight distribution, the latter atom transfer radical polymerization method is preferred.

The vinyl polymer (A) having at least one alkenyl group per molecule can also be produced from a vinyl polymer having at least one hydroxyl group by any of the following and other methods without being limited thereto.

(A-g) The method which comprises permitting a base, such as sodium methoxide, to act on the hydroxyl group or groups of the vinyl polymer having at least one hydroxyl group and then reacting the same with an alkenyl-containing halide such as allyl chloride;

(A-h) the method which comprises reacting an alkenyl-containing isocyanate compound, such as allyl isocyanate or the like, with said hydroxyl group;

(A-i) the method which comprises reacting an alkenyl-containing acid halide, such as (meth) acryloyl chloride, with said hydroxyl group in the presence of a base such as pyridine;

(A-j) the method which comprises reacting an alkenyl-containing carboxylic acid, such as acrylic acid, with said hydroxyl group in the presence of an acid catalyst; and (A-k) the method which comprises reacting a diisocyanate compound with said hydroxyl group and reacting the remaining isocyanato group with a compound of the following general formula (11), such as 2-hydroxypropyl methacrylate:

$$CH_2=C(R^1)-C(O)-R^{19}-OH \quad (11)$$

(wherein $R^1$ is as defined below; $R^{19}$ represents a divalent organic group containing 2 to 20 carbon atoms), among others.

In the present invention, when a halogen is not directly involved in the introduction of an alkenyl group as in the methods (A-a) and (A-b), it is preferable to synthesize the vinyl polymer by utilizing the living radical polymerization technique. Between the above methods, the method (A-b) is preferred in view of the ease of control.

When an alkenyl group is to be introduced by converting the halogen of a vinyl polymer having at least one highly reactive carbon-halogen bond, it is preferred to use a vinyl polymer having at least one highly reactive terminal carbon-halogen bond as obtained by the radical polymerization (atom transfer radical polymerization) of a vinyl monomer using an organohalogen compound containing at least one highly reactive carbon-halogen bond or a sulfonyl halide as the initiator and a transition metal complex as the catalyst. More preferred is the method (A-f) in view of the ease of control.

The technology of producing the vinyl polymer containing at least one hydroxyl group includes the following methods, among others.

(B-a) The method in which, in synthesizing a vinyl polymer by radical polymerization, a compound having both a polymerizable alkenyl group and a hydroxyl group per molecule, such as the compound represented by the following general formula (12), is reacted as a second monomer.

$$H_2C=C(R^2)-R^{12}-R^{13}-OH \quad (12)$$

(wherein $R^2$, $R^{12}$ and $R^{13}$ are as defined above)

The timing of reacting said compound having both a polymerizable alkenyl group and a hydroxyl group per molecule is not particularly restricted but when a polymer having rubber-like properties is to be formed by living radical polymerization, it is preferred to react the second monomer at a terminal stage of polymerization or after completion of the reaction of a certain monomer.

(B-b) The method in which, in synthesizing a vinyl polymer by living radical polymerization, an alkenyl alcohol such as 10-undecenol, 5-hexenol or allyl alcohol is reacted at a terminal stage of polymerization or after completion of the reaction of the certain monomer.

(B-c) The method for radical polymerization of a vinyl monomer which comprises using a hydroxyl-containing chain transfer agent, such as the hydroxyl-containing polysulfide described in. Japanese Kokai Publication Hei-5-262808, in a large quantity.

(B-d) The method for radical polymerization of a vinyl monomer which comprises using hydrogen peroxide or a hydroxyl-containing initiator as described in Japanese Kokai Publication Hei-6-239912 and Japanese Kokai Publication Hei-8-283310, for instance.

(B-e) The method for radical polymerization of a vinyl monomer which comprises using an alcohol in excess as described in Japanese Kokai Publication Hei-6-116312, for instance.

(B-f) The method which comprises hydrolyzing the halogen of a vinyl polymer containing at least one highly reactive carbon-halogen bond or reacting it with a hydroxyl-containing compound to introduce a hydroxyl group into the polymer terminus as described in Japanese Kokai Publication Hei-4-132706, for instance.

(B-g) The method which comprises reacting a vinyl polymer having at least one highly reactive carbon-halogen bond with a hydroxyl-containing stabilized carbanion, as represented by the following general formula (13), to substitute for the halogen.

$$M^+C^-(R^{14})(R^{15})-R^{16}-OH \quad (13)$$

(wherein $R^{14}$ and $R^{15}$ each represents an electron-withdrawing group which stabilizes carbanion $C^-$ or one of them represents said electron-withdrawing group with the other being hydrogen, an alkyl group of 1 to 10 carbon atoms, or a phenyl group; $R^{16}$ represents a direct bond or a divalent organic group of 1 to 10 carbon atoms which may contain one or more ether linkages; $M^+$ represents an alkali metal ion or a quaternary ammonium ion).

As the electron-withdrawing groups for $R^{14}$ and $R^{15}$, groups having the structure represented by any of the formulas —$CO_2R$, —$C(O)R$ and —$CN$ are particularly preferred.

(B-h) The method which comprises permitting an elemental metal, e.g. zinc, or an organometal compound to act on a vinyl polymer having at least one highly reactive carbon-halogen bond to prepare an enolate anion and then reacting it with an aldehyde or a ketone.

(B-i) The method which comprises reacting a vinyl polymer having at least one highly reactive carbon-halogen bond with a hydroxyl-containing oxoanion or carboxylate anion of the general formula (14) or (15) to substitute for the halogen.

$$HO-R^{20}-O^-M^+ \quad (14)$$

(wherein $R^{20}$ represents a divalent organic group of 1 to 20 carbon atoms which may contain one or more ether linkages; $M^+$ has the same meaning as defined above)

$$HO-R^{20}-C(O)O^-M^+ \quad (15)$$

(wherein $R^{20}$ and $M^+$ are both as defined above)

In the present invention, when a halogen is not directly involved in the introduction of a hydroxyl group as in the methods (B-a) to (B-e), the vinyl polymer is preferably synthesized by the living radical polymerization technique. In consideration of the ease of control, the method (B-b) is particularly preferred.

When the halogen of a vinyl polymer having at least one highly reactive carbon-halogen bond is to be converted for the introduction of a hydroxy group, it is preferred to use a vinyl polymer having at least one highly reactive carbon-halogen bond at the terminus which has been obtained by the radical polymerization (atom transfer radical polymerization) of a vinyl monomer using an organohalogen compound or halogenated sulfonyl compound as the initiator and a transition metal complex as the catalyst. In consideration of the ease of control, the method (B-i) is still more preferred.

The composition for roller according to the first embodiment of the present invention comprises, in addition to the above component (A), a curing agent (B) having at least two hydrosilyl groups per molecule and a hydrosilylation catalyst (C). In this embodiment, the component (A) is hydrosilylated by the component (B) and undergoes curing. Since this component contains at least one alkenyl group, it is hydrosilylated to be polymerized and cured.

The alkenyl group in this first embodiment is a group of the following general formula.

$$CH_2=CR^2-$$

(wherein $R^2$ represents hydrogen or a methyl group)

The curing agent having at least two hydrosilyl groups per molecule for use as the component (B) of the composition for roller according to this first embodiment of the present invention acts as the curing agent for the component (A) vinyl polymer having at least one alkenyl group per molecule. The component (B) contains at least two, preferably 2 to 50, more preferably 2 to 20, still more preferably 2 to 15, particularly 3 to 12, hydrosilyl groups and each of these hydrosilyl groups reacts with the alkenyl group of the component (A) molecule so that the composition cures. When the number of hydrosilyl groups is less than 2, the speed of cure of the composition due to hydrosilylation is reduced to cause an increased incidence of poor curing. When the number of hydrosilyl groups exceeds 50, the stability of the curing agent (B) and, hence, the stability of the composition of the invention are adversely affected and, furthermore, a large proportion of hydrosilyl groups tend to remain in the cured product to cause voids and cracks after curing.

The "contains one hydrosilyl group" means to contain one SiH group and although $SiH_2$ is reckoned as 2 hydrosilyl groups, the H atoms to be attached to Si are preferably attached to different Si atoms and this is preferred in terms of curability and rubber-like elasticity.

The molecular weight of the component (B), in consideration of dispersibility of the optional component (E) to be described later herein and roller processability, is preferably not larger than 30,000, preferably not larger than 20,000, particularly 15,000 or less, in terms of number average molecular weight (Mn). Taking the reactivity and compatibility with the component (A) also into consideration, the still more preferred range is 300 to 10,000.

The structure of said component (B) is not particularly restricted but, as a specific example, there may be mentioned a hydrosilyl-containing hydrocarbon series curing agent represented by the general formula (2) and having a number average molecular weight of not more than 30,000.

$$R^{21}X_a \quad (2)$$

(wherein X represents a group containing at least one hydrosilyl group; $R^{21}$ represents a mono- through tetravalent hydrocarbon group containing 2 to 150 carbon atoms; a represents an integer of 1 to 4; provided, however, that when X contains only one hydrosilyl group, a is not less than 2).

Referring to the above general formula (2), X represents a group containing at least one hydrosilyl group and, examples of the group include hydrosilyl groups containing only one silicon atom, such as $-SiH_n(CH_3)_{3-n}$, $-SiH_n(C_2H_5)_{3-n}$, $-SiH_n(C_6H_5)_{3-n}$ (n=1~3 in the above formulas), $-SiH_2(C_6H_{13})$, etc., and hydrosilyl groups containing 2 or more silicon groups, such as

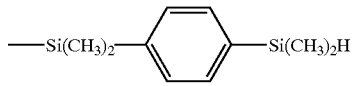

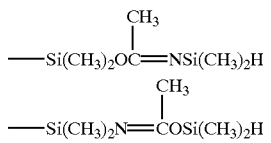

among others, and hydrosilyl groups derived from various chain, branched or cyclic polyvalent hydrogen siloxanes such as those represented by the following formulas:

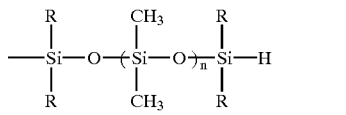

(R each independently represents any of $CH_3$, $C_2H_5$, $C_6H_5$ and $OSi(CH_3)_3$, n = 0~50)

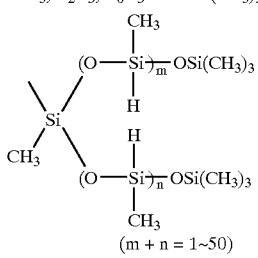

(m + n = 1~50)

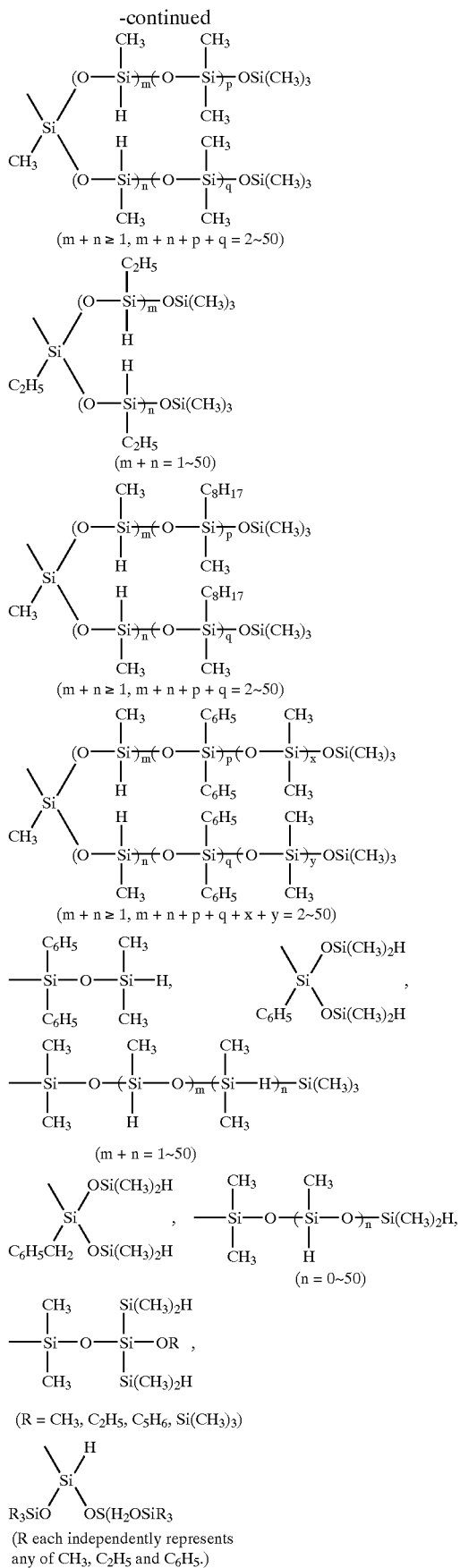

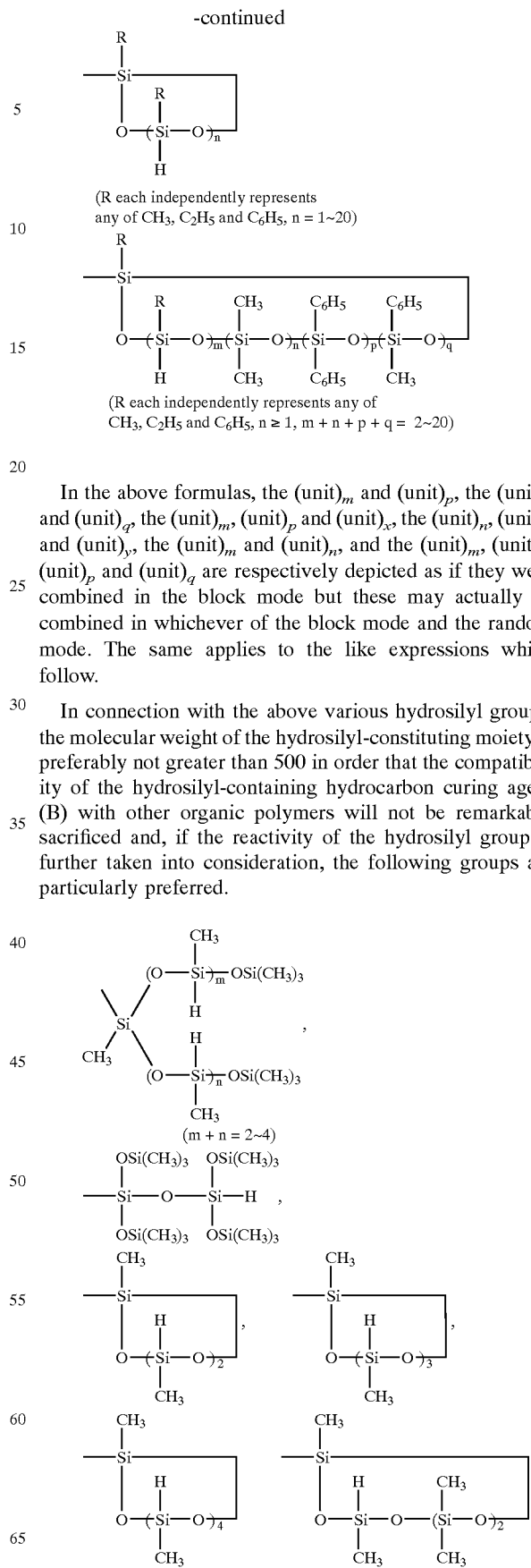

In the above formulas, the (unit)$_m$ and (unit)$_p$, the (unit)$_n$ and (unit)$_q$, the (unit)$_m$, (unit)$_p$ and (unit)$_x$, the (unit)$_n$, (unit)$_q$ and (unit)$_y$, the (unit)$_m$ and (unit)$_n$, and the (unit)$_m$, (unit)$_n$, (unit)$_p$ and (unit)$_q$ are respectively depicted as if they were combined in the block mode but these may actually be combined in whichever of the block mode and the random mode. The same applies to the like expressions which follow.

In connection with the above various hydrosilyl groups, the molecular weight of the hydrosilyl-constituting moiety is preferably not greater than 500 in order that the compatibility of the hydrosilyl-containing hydrocarbon curing agent (B) with other organic polymers will not be remarkably sacrificed and, if the reactivity of the hydrosilyl group is further taken into consideration, the following groups are particularly preferred.

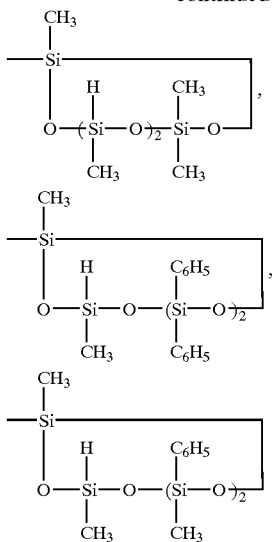

The foregoing groups are referred to sometimes collectively as the group represented by the (formula 8).

In the general formula (2), $R^{21}$ represents a mono- through tetravalent hydrocarbon group containing 2 to 150 carbon atoms, which may comprise a polymer. As specific examples, the following groups can be mentioned.

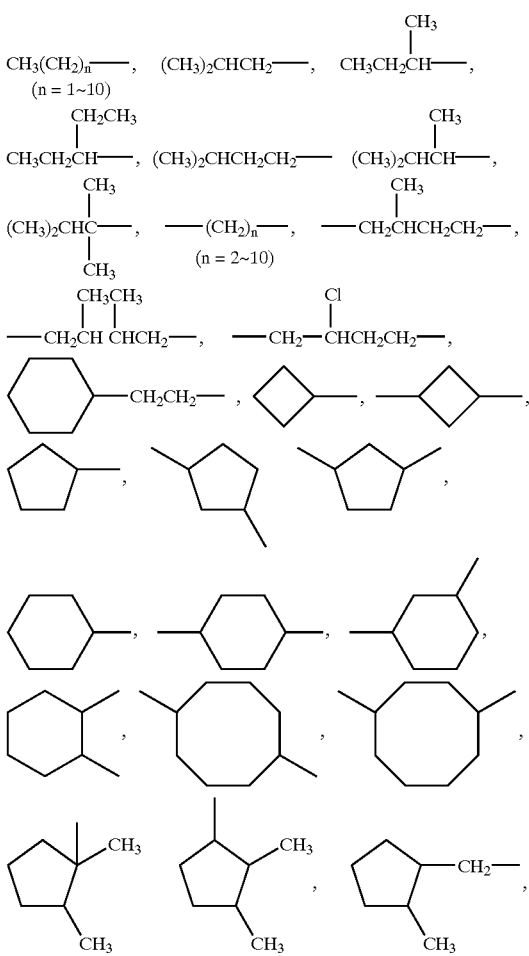

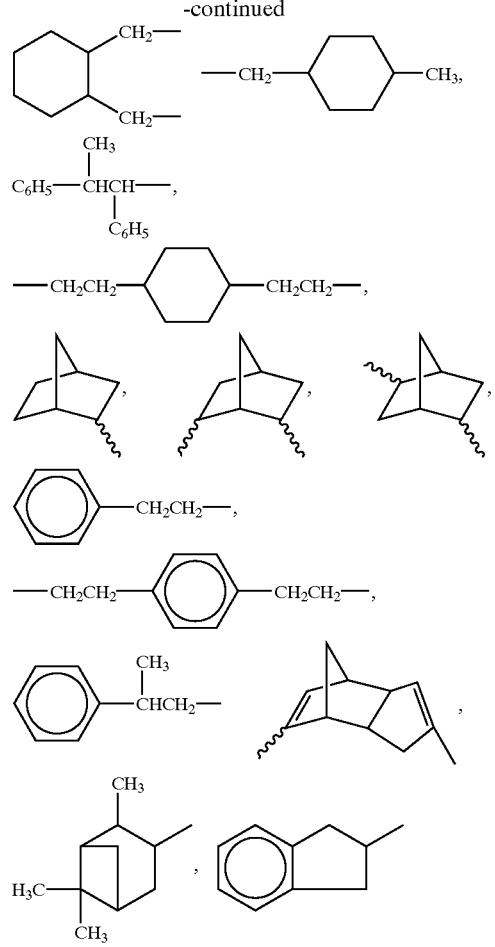

(These groups are described in, for example, Japanese Kokai Publication Hei-3-95266). Further, examples of the group $R^{21}$ comprising a polymer include the mono- through tetravalent groups as formed by polymerizing an olefinic compound of 2 to 6 carbon atoms, such as ethylene, propylene, 1-butene and isobutylene, as the main monomer and the mono- through tetravalent groups as formed by homopolymerizing a diene compound, such as butadiene and isoprene, or copolymerizing said olefinic compound with such a diene compound and hydrogenating the resulting polymer. Among the hydrocarbon series curing agents having said $R^{21}$ and X groups as represented by the general formula (2), the combination in which $R^{21}$ is a hydrocarbon group containing 5 to 20 carbon atoms and X is one of the groups represented by the (formula 8) is preferred from the standpoint of enhanced reactivity to favor formation of a satisfactory network structure and in terms of compatibility with the component (A).

Further, among these, the combination in which $R^{21}$ is a hydrocarbon group of 5 to 12 carbon atoms is preferred in consideration of the availability of the starting material and the case in which X is a cyclic polysiloxane group, among the groups of the (formula 8), is preferred because of better compatibility with the component (A). Thus, the compound according to the above combination is preferred as the hydrocarbon series curing agent. As specific examples, the following compounds can be mentioned.

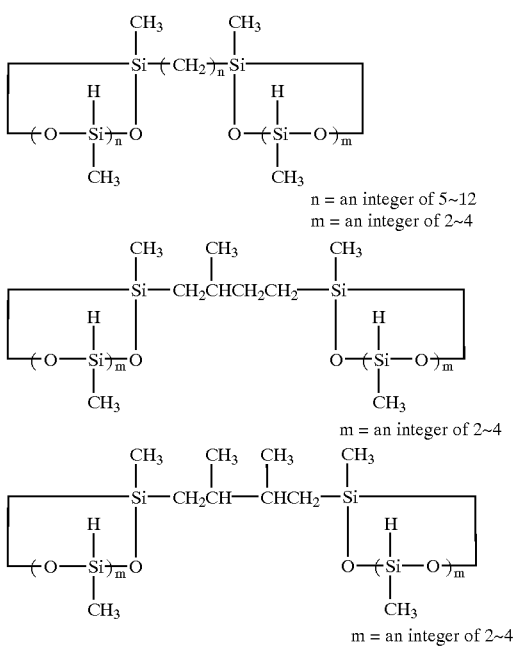

n = an integer of 5~12
m = an integer of 2~4 m = an integer of 2~4 m = an integer of 2~4

The method of producing the hydrosilyl-containing hydrocarbon series curing agent (B) is not particularly restricted but can be prepared by an arbitrary procedure.

For example, there can be mentioned (i) the method which comprises treating a hydrocarbon series curing agent having an SiCl group within the molecule with a reducing agent, such as $LiAlH_4$, $NaBH_4$ or the like, to thereby reduce the SiCl group to the SiH group, (ii) the method which comprises reacting a hydrocarbon compound having a given functional group $X^1$ within the molecule with a compound having both a functional group $Y^1$ reactive to said functional group $X^1$ and a hydrosilyl group within the molecule, and (iii) the method which comprises hydrosilylating an alkenyl-containing hydrocarbon compound with a polyhydrosilane compound having at least two hydrosilyl groups to leave hydrosilyl groups within the molecule of said hydrocarbon compound after the reaction.

Among the above methods, the method (iii) is comparatively simple process-wise and can be used with advantage. In this method, two or more hydrosilyl groups of a partial population of polyhydrosilane molecules may react with the alkenyl groups of the hydrocarbon compound to cause an increase in molecular weight but the compound containing molecules of such increased molecular weight can also be used as the component (B) without any untoward effect.

The polysiloxane series curing agent can also be used as the component (B). As examples, the following chain and cyclic polyorganohydrogensiloxanes (inclusive of polyoxyalkylene-modified compounds, styrene-modified compounds, olefin-modified compounds, etc.) can be mentioned.

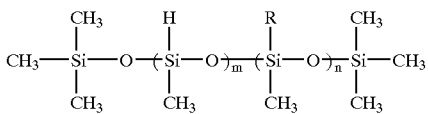

(wherein m and n are integers such that $10 \leq m+n \leq 50$, $2 \leq m$ and $0 \leq n$; R represents a methyl group, a polyoxyalkylene group having a molecular weight of 100 to 10,000, or a hydrocarbon group containing 2 to 20 carbon atoms which may optionally have one or more phenyl groups; when a plurality of R groups are present, they need not be the same).

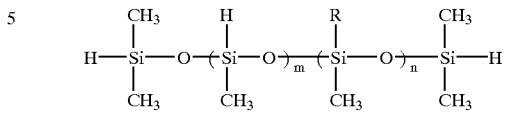

(wherein m and n are integers such that $10 \leq m+n \leq 50$, $2 \leq m$ and $0 \leq n$; R represents a methyl group, a polyoxyalkylene group having a molecular weight of 100 to 10,000, or a hydrocarbon group containing 2 to 20 carbon atoms which may optionally have one or more phenyl groups; when a plurality of R groups are present, they need not be the same).

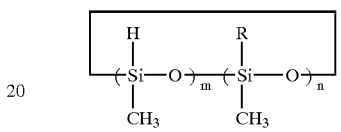

(wherein m and n are integers such that $3 \leq m+n \leq 20$, $2 \leq m \leq 19$ and $0 \leq n \leq 18$; represents a methyl group, apolyoxyalkylene group having a molecular weight of 100 to 10,000, or a hydrocarbon group containing. 2 to 20 carbon atoms which may optionally have one or more phenyl groups; when a plurality of R groups are present, they need not be the same).

For improved compatibility with the component (A), said R is preferably a phenyl-containing group. Moreover, in consideration of availability, $-CH_2-CH_2-C_6H_5$ or $-CH_2-CH(CH_3)-C_6H_5$ is preferred, and from the standpoint of shelf-life, $-CH_2-CH(CH_3)-C_6H_5$ is preferred.

In the first embodiment of the present invention, a hydrosilylation catalyst is used as the component (C) in addition to said components (A) and (B). The hydrosilylation catalyst (C) is not particularly restricted but may, for example, comprise a radical initiator, such as an organic peroxide and an azo compound, and a transition metal catalyst.

The radical initiator mentioned above is not particularly restricted but a variety of compounds can be utilized. By way of example, the initiator includes dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butyl cumyl peroxide, α, α'-bis(t-butylperoxy)isopropylbenzene, etc.; diacyl peroxides such as benzoyl peroxide, p-chlorobenzoyl peroxide, m-chlorobenzoyl peroxide, 2,4-dichlorobenzoyl peroxide, lauroyl peroxide, etc.; peroxy acid esters such as t-butyl perbenzoate; peroxycarbonates such as diisopropyl diperoxycarbonate, di-2-ethylhexyl diperoxycarbonate, etc.; and peroxy ketals such as 1,1-di(t-butylperoxy)cyclohexane, 1,1-di(t-butylperoxy)-3,3,5-trimethylcyclohexane and so on.

The transition metal catalyst mentioned above is not particularly restricted but includes, among others, platinum metal, a dispersion of solid platinum in a matrix such as alumina, silica, carbon black or the like, and platinum compounds such as chloroplatinic acid, a complex of chloroplatinic acid with an alcohol, aldehyde or ketone, platinum-olefin complexes, platinum/phosphite complexes, and platinum(0)-divinyltetramethyldisiloxane complex. Catalysts other than platinum compounds include RhCl(PPh$_3$)$_3$, RhCl$_3$, RuCl$_3$, IrCl$_3$, FeCl$_3$, AlCl$_3$, PdCl$_2$·H$_2$O, NiCl$_2$ and TiCl$_4$, among others. These catalysts can be used independently or two or more of them may be used.

Among the above hydrosilylation catalysts, transition metal catalysts are preferred and platinum compounds are particularly preferred.

The composition for roller according to the first embodiment of the present invention is prepared using the above components (A) to (C). Regarding the relative amount of the component (A) and component (B), the proportion of hydrosilyl in the component (B) is preferably 0.2 to 5.0 moles, more preferably 0.4 to 2.5 moles, per mole of alkenyl in the component (A) in view of an improved rubber-like elasticity.

The proportion of the hydrosilylation catalyst as the component (C) should be $10^{-1}$ to $10^{-6}$ moles per mole of alkenyl in the component (A).

The composition for roller of the present invention, described above, may optionally be supplemented with the component (E), such as carbon black or a finely divided metal powder for imparting electrical conductivity, or a conductivity-imparting compound, e.g. an organic antistatic agent, such as organic compounds or polymers a containing quaternary ammonium base group, a carboxyl group, a sulfonic acid group, a sulfate ester group or a phosphate ester group, compounds or polymers containing an electrically conductive unit as represented by etheresteramide or etheramideimide polymers, ethylene oxide-epihalohydrin copolymers, methoxylated polyethylene glycol acrylate polymers, etc., fillers for improving processability and cost economics, preservative-stabilizers, plasticizers, ultraviolet absorbers, lubricants and pigments, among others.

The carbon black mentioned above preferably has a mean particle diameter of about 15 to 19 m $\mu$, and as a specific example, there may be mentioned EC carbon which can be obtained by a pyrolytic process.

As the finely divided metal powder mentioned above, metal powders having a mean particle diameter of about 0.1 $\mu$m to 3 m $\mu$ can be used with advantage and, as a specific example, Ni powders can be mentioned.

As said organic compounds or polymers containing a quaternary ammonium base group (e.g.

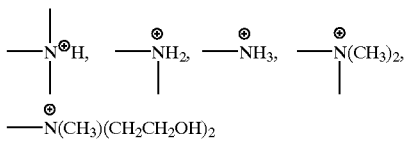

etc.), a carboxyl group (not only —COOH but also carboxylate salt groups such as —COONa, —COOK, etc. are included), a sulfonic acid group (not only —SO$_3$H but also sulfonate salt groups such as —SO$_3$Na, —SO$_3$K, etc. are also included), a sulfate ester group (—OSO$_3$Na, —OSO$_3$K, etc.) and a phosphate ester group (—OPO$_3$K$_2$ etc.), there can be mentioned organic compounds containing a quaternary ammonium base group, e.g. quaternary ammonium chloride, quaternary ammonium sulfate, quaternary ammonium nitrate, etc., polymers containing a quaternary ammonium base, e.g. a polyvinylbenzyl cation, a polyacrylic cation or the like, carboxyl-containing organic compounds such as alkali metal salts of higher fatty acids, carboxyl-containing polymers such as ionomers, sulfonic acid group-containing organic compounds such as alkyl sulfonates, alkylbenzene sulfonates, etc., sulfonic acid group-containing polymers such as polyvinylbenzyl sulfonates, polyacryloyl sulfonates, etc., sulfate ester-containing organic compounds such as alkyl sulfates, and phosphate ester compounds such as alkyl phosphates.

Aside from the above compounds, there may also be used amphoteric organic antistatic agents such as alkyl betaine type, alkylimidazoline type or alkylalanine type compounds and nonionic organic antistatic agents such as polyoxyethylene alkylamines, polyoxyethylene alkylamides, polyoxyethylene alkyl ethers, polyoxyethylene alkylphenyl ethers, glycerol fatty acid esters and sorbitan fatty acid esters.

The etheresteramide or etheramideimide polymer mentioned above means a polymer which contains a group comprising ether and esteramide units or ether-linked esteramide units and, as the whole polymer, imparts electrical conductivity.

The ethylene oxide-epihalohydrin copolymer mentioned above is a copolymer of an epihalohydrin, such as epichlorohydrin, with ethylene oxide.

The methoxylated polyethylene glycol acrylate mentioned above means a polymer of methoxylated polyethylene glycol with acrylate ester.

Among the above-mentioned organic antistatic agents, preferred are quaternary ammonium base group-, carboxylic acid group-, or sulfonic acid group-containing acrylic oligomers, maleimide copolymers and acrylimide copolymers, polyetheresteramides, polyetheramideimides, ethylene oxide-epihalohydrin copolymers, and methoxylated polyethylene glycol acrylate oligomers. When said organic antistatic agent is a polymer, a liquid polymer is preferred and, therefore, the average molecular weight of the polymer should preferably be within the range giving a liquid state.

The addition amount of the optional conductivity-imparting component (E) to the composition for roller comprising the components (A) to (C) of the invention is not particularly restricted but is usually about 0.01 to 30% based on the total weight of said components (A) to (C), that is to say such an amount that the resistivity value of the cured product will be $10^3$ to $10^{10}$ Ω·cm.

When carbon black or a finely divided metal powder is used as the component (E), it is generally used in such an amount that the specific resistivity of the cured product will be $10^3$ to $10^6$ Ω·cm.

When the organic antistatic agent mentioned above is added to the composition for roller comprising the components (A) to (C) of the invention, the addition amount is not particularly restricted but is about 0.5 to 30% based on the total amount of the components (A) to (C). In this case, it is chiefly used to bring the volume resistivity to $10^7$ to $10^{10}$ Ω·cm.

The composition of the invention comprising the components (A) to (C), optionally supplemented with the component (E) and other additives, is cast, injected, extruded or otherwise molded using a metal mold having a SUS shaft centrally disposed, followed by curing at about 30 to 150° C., preferably about 80 to 140° C., for 1 hour to 10 seconds, preferably about 20 to 1 minute. In this manner, there can be obtained a roller which can be used in operative contact with the photoreceptor of an electrographic duplicator or printer or a roller for use in paper feed in such a machine. The semi-cured roller may be post-cured.

According to the second embodiment of the present invention, the alkenyl group contained in the vinyl polymer (A) is a polymerizable carbon-carbon double bond. Preferably, the alkenyl group has the following general formula (1)

(wherein $R^1$ represents hydrogen, a methyl group, —CN, or a monovalent hydrocarbon group of 1 to 20 carbon atoms which may optionally contain an oxygen atom).

In the general formula (1), $R^1$ is not particularly restricted but includes —H, —CH$_3$, —CH$_2$CH$_3$, —(CH$_2$)$_n$CH$_3$ (n is an integer of 2 to 19), —$C_6H_5$, —$CH_2OH$ and —CN, among others, although —H or —$CH_3$ is preferred.

In this embodiment, the polymerizable carbon-carbon double bond undergoes polymerization to give a cured product and this polymerization can be accelerated by adding a polymerization initiator (D) and heating or irradiating the system. As examples of the component (D), a thermal polymerization initiator and a photopolymerization initiator can be mentioned.

The thermal initiator is not particularly restricted but includes azo compounds, peroxides, persulfates and redox initiators.

Suitable azo initiators, include but are not limited to 2,2'-azobis(4-methoxy-2,4-dimethylvaleronitrile) (VAZO 33), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64), 2,2'-azobis-2-methylbutyronitrile (VAZO 67), 1,1-azobis(1-cyclohexanecarbonitrile) (VAZO 88) (all available from DuPont Chemical), 2,2'-azobis(2-cyclopropylpropionitrile), and 2,2'-azobis(methyl isobutyrate) (V-601) (available from Wako Pure Chemical Ind.), among others.

Suitable peroxide initiators include but are not limited to benzoyl peroxide, acetyl peroxide, lauroyl peroxide, decanoyl peroxide, dicetyl peroxydicarbonate, di(4-t-butylcyclohexyl) peroxydicarbonate (Perkadox 16S) (available from Akzo Nobel), di (2-ethylhexyl) peroxydicarbonate, t-butyl peroxypivalate (Lupersol 11) (available from Elf Atochem), t-butyl peroxy-2-ethylhexanoate (Trigonox 21-C50) (available from Akzo Nobel), and dicumyl peroxide.

Suitable persulfate initiators include but are not limited to potassium persulfate, sodium persulfate, and ammonium persulfate.

Suitable redox (oxidation-reduction) initiators include but are not limited to combinations of said persulfate initiators with a reducing agent such as sodium hydrogen metasulfite and sodium hydrogen sulfite; organic peroxide-tertiary amine systems, e.g. benzoyl peroxide-dimethylaniline; and organic hydroperoxide-transition metal systems, e.g. cumene hydroperoxide-cobalt naphthenate.

Other initiators include but are not limited to pinacols such as tetraphenyl-1,1,2,2-ethanediol.

Preferred thermal initiators can be selected from among azo initiators and peroxide initiators. Still more preferred are 2,2'-azobis (methyl isobutyrate), t-butyl peroxypivalate, di(4-t-butylcyclohexyl) peroxydicarbonate, and a mixture thereof.

The thermal initiator in the present invention should be added in a catalytically effective amount which is not particularly restricted but is typically about 0.01 to 5 weight parts, preferably about 0.025 to 2 weight parts based on 100 weight parts of the polymer (A) and other monomer/oligomer combined. The above thermal initiator can be used as a mixture and, when the total amount of the polymer (A) and monomer/oligomer mixture is taken as 100 weight parts, the initiator can be formulated in a proportion of about 0.01 to 5 weight parts, preferably about 0.025 to 2 weight parts.

The photopolymerization initiator that can be used is not particularly restricted but is preferably a photoradical initiator or a photoanionic initiator. For example, there qan be mentioned acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl) ketone, benzyl methoxy ketal and 2-chlorothioxanthone. These initiators can be used alone or in combination with other compounds. As specific examples, combinations with an amine such as diethanolmethylamine, dimethylethanolamine, triethanolamine or the like, combinations further including an iodonium salt such as diphenyliodonium chloride, and combinations with a pigment, e.g. methylene blue, and an amine can be mentioned.

As the near-infrared photopolymerization initiator, cationic dyes absorbing in the near infrared (IR) region of the spectrum can be used. As such near IR-absorbing cationic dyes, it is preferred to use the near-IR-absorbing cationic dye-borate anion complexes which are excited by the energy of light within the range of 650 to 1500 nm as disclosed in Japanese Kokai Publication Hei-3-111402 and Japanese Kokai Publication Hei-5-194619, among others, and it is still more advantageous to use a boron-type sensitizer in combination.

The addition amount of the photopolymerization initiator to be required is just enough to slightly photoactivate the system. The amount of use of the photopolymerization initiator is not particularly restricted but is preferably 0.001 to 10 weight parts based on 100 weight parts of the polymer contained in the composition.

The composition for roller according to the second embodiment of the present invention may optionally be supplemented with said conductivity-imparting compound (E). The addition amount of the component (E), if used, is not particularly restricted but may usually be about 0.01 to 30% relative to the component (A), thence the volume resistivity of the cured roller will be $10^3$ to $10^{10}$ Ω·cm.

Generally, carbon black or a finely divided metal powder is used as component (E) for controlling the volume resistivity to $10^3$ to $10^6$ Ω·cm.

The organic antistatic agent is usually added as component (E) to control the volume resistivity to $10^7$ to $10^{10}$ Ω·cm, and preferred addition amount is about 0.5 to 30% based on component (A).

The composition for roller according to the second aspect of the present invention may optionally be supplemented with a polymerizable monomer and/or oligomer. As such polymerizable monomer and/or oligomer, it is preferred to use monomers and/or oligomers having radical-polymerizable groups or monomers and/or oligomers having anion-polymerizable groups. The radical-polymerizable groups include (meth)acryloyl, styryl, acrylonitrile, vinyl ester, N-vinylpyrrolidone, acrylamide, conjugated diene, vinyl ketone, and vinyl chloride groups, among others. Among these, monomers and/or oligomqrs having (meth) acryloyl groups similar to those possessed by the polymer of the invention are preferred. The anion-polymerizable groups include (meth)acryloyl, styryl, acrylonitrile, N-vinylpyrrolidone, acrylamide, conjugated diene, and vinyl ketone groups, among others. Among these, those having a (meth)acrylate group similar to the one possessed by the polymer of the invention are preferred.

As examples of such monomers, there can be mentioned (meth)acrylate monomers, cyclic acrylates, N-vinylpyrrolidone, styrenic monomers, acrylonitrile, N-vinylpyrrolidone, acrylamide monomers, conjugated diene monomers and vinyl ketone monomers, among others.

The (meth)acrylate monomers include n-butyl (meth)acrylate, 2-ethylhexyl (meth)acrylate, isooctyl (meth)acrylate, isononyl (meth)acrylate, and compounds of the following formulas.

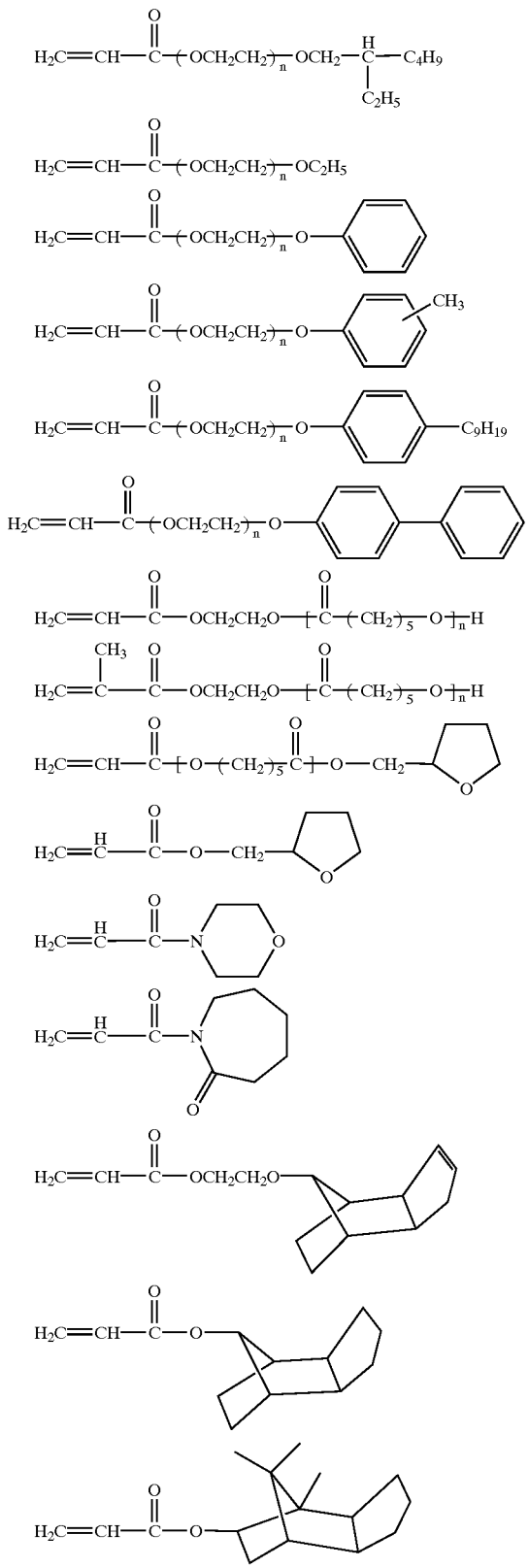

-continued

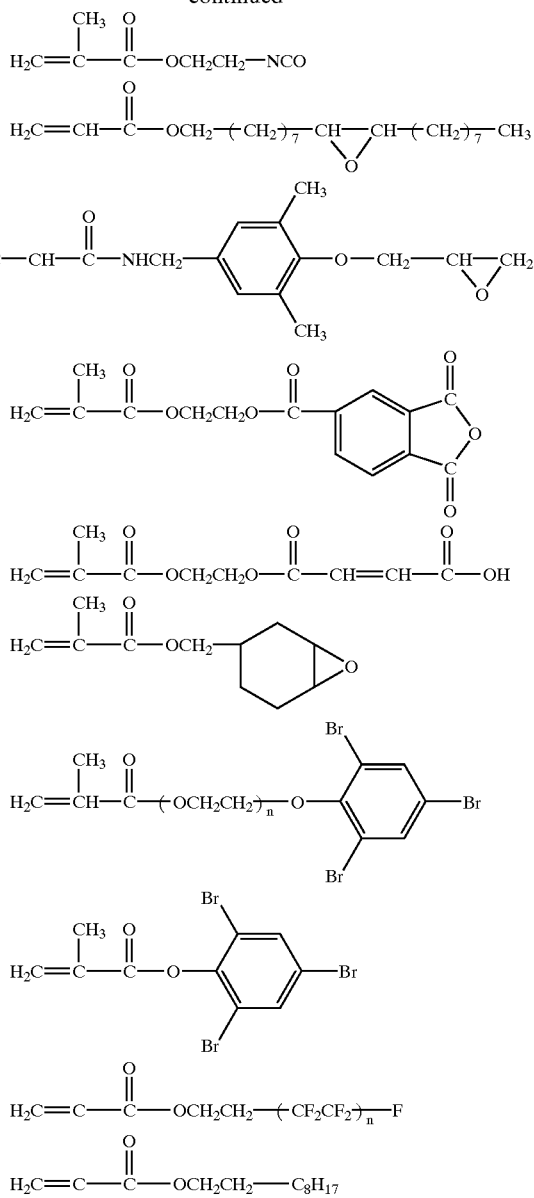

The styrenic monomer includes styrene, α-methylstyrene, etc.; the acrylamide monomer includes acrylamide, N,N-dimethylacrylamide, etc.; the conjugated diene monomer includes butadiene, isoprene, etc.; and the vinyl ketone monomer includes methyl vinyl ketone, among others.

The polyfunctional monomer includes neopentyl glycol polypropoxy diacrylate, trimethylolpropane polyethoxy triacrylate, bisphenol F polyethoxy diacrylate, bisphenol A polyethoxy diacrylate, dipentaerythritol polyhexanolide hexaacrylate, tris(hydroxyethyl)isocyanurate polyhexanolide triacrylate, tricyclodecanedimethylol diacrylate, 2-(2-acryloyloxy-1,1-dimethyl)-5-ethyl-5-acryloyloxymethyl-1,3-dioxane, tetrabromobisphenol A diethoxy diacrylate, 4,4-dimercaptodiphenyl sulfide dimethacrylate, polytetraethylene glycol diacrylate, 1,9-nonanediol diacrylate and ditrimethylolpropane tetraacrylate, among others.

The oligomer includes epoxy acrylate resins such as bisphenol A epoxy acrylate resin, phenol novolac epoxy acrylate resin, cresol novolac epoxy acrylate resin, etc., COOH-modified epoxy acrylate resins, urethane acrylate resins obtainable by reacting a hydroxyl-containing (meth) acrylate [e.g. hydroxyethyl(meth)acrylate, hydroxypropyl (meth)acrylate, hydroxybutyl (meth)acrylate, or pentaerythritol triacrylate] with the urethane resin obtained from a polyol (e.g. polytetramethylene glycol, ethylene glycoladipic acid polyester diol, ε-caprolactone-modified polyester diols, polypropylene glycol, polyethylene glycol, polycarbonate diols, hydroxy-terminated hydrogenated polyisoprene, hydroxy-terminated polybutadiene, hydroxy-terminated polyisobutylene, etc.) andanorganicisocyanate (e.g. tolylene diisocyanate, isophorone diisocyanate, diphenylmethane diisocyanate, hexamethylene diisocyanate, xylylene diisocyanate, etc.), and resins synthesized by introducing (meth)acryl groups into said polyols through ester linkages, and polyester acrylate resins.

These monomers and oligomers are selected with reference to the polymerization initiator and curing conditions to be used.

The number average molecular weight of the (meth) acryloyl-containing monomer and/or oligomer is preferably not larger than 2000 and, from a compatibility point of view, is more preferably not larger than 1000.

The composition for roller according to the second embodiment of the present invention may optionally be supplemented with a filler for improved processability and cost advantage, a preservative-stabilizer, a plasticizer, a UV absorber, a lubricant, a pigment and other additives.

The method of curing the composition for roller as the second embodiment of the present invention is not particularly restricted but, depending on the properties of the polymerization initiator as the component (D), heating or irradiation is utilized. The irradiation is made with light or an electron beam using a high-pressure mercury vapor lamp, a low-pressure mercury vapor lamp, an electron beam bombarding device, a halogen vapor lamp, a light-emitting diode, a semiconductor laser or the like as an energy source.

By curing the composition for roller of the second embodiment by the above method, there can be provided various kinds of rollers for use in contact with the photoreceptor of an electronic copying machine or printer or those for paper feed. Optionally, semi-cured products may be post-cured. Particularly in the composition obtained using a photopolymerization initiator, the desired moldings can be obtained by a short time of irradiation with light or an electron beam.

The roller formed on cure of the composition for roller, in accordance with the first embodiment or the second embodiment, is so adhesive that it can be directly subjected to surface coating with a nylon material or covering with a heat-shrinkable tube without requiring the primer treatment or epichlorohydrin rubber coating in advance which is essential to the conventional roller made of a polyurethane or the like material. As a result, the variation in roller characteristics due to the presence of an intermediate layer is inhibited and the production cost is reduced.

Furthermore, the volume resistivity of the manufactured roller is $10^3$ to $10^{10}$ Ω·cm and can be even controlled to $10^3$ to $10^6$ Ω·cm by formulating carbon black or to $10^7$ to $10^{10}$ Ω·cm by formulating an organic antistatic agent.

On the roller fabricated by the above method, there can be constructed a surface layer (a polymer protective layer) using a nylon, acrylic resin, fluororesin, urethane resin or silicone resin composition containing an organic antistatic agent and a minor amount of carbon black.

The surface layer may be a coating layer or a tubular cover and its thickness may be 15 to 300 μm, preferably 30 to 200 μm.

The volume resistivity of the surfacer is $10^7$ to $10^{11}$ Ω·cm, preferably $10^7$ to $10^9$ Ω·cm. When the roller is to be used for charging the photoreceptor, the resistance value of the shaft and surface is set to 0.1 to 100 MΩ, preferably 1 to 30 MΩ, and when it is to be used for transfer of the toner image, the resistance value is set to 100 to 1000 MΩ. For use as the development roller for the nonmagnetic toner, the roller resistance is adjusted to 0.01 to 10 MΩ.

BEST MODE FOR CARRYING OUT THE INVENTION

The following working and comparative examples illustrate the present invention in further detail, although these are by no means limitative of the present invention.

In the following working and comparative examples, all "parts" and "%" are parts by weight and weight %, respectively.

The "number average molecular weight" and "molecular weight distribution" (ratio of weight average molecular weight to number average molecular weight) values given in the following examples were calculated by the polystyrene standard method using gel permeation chromatography (GPC). As GPC columns, styrene crosslinked gel-packed columns were used, and as the GPC solvent, chloroform was used.

Production Example 1

Synthesis of an Alkenyl-terminated poly(butyl acrylate)

A 10 L separable flask equipped with a reflux condenser and stirrer was charged with CuBr (28.0 g, 0.20 mol). After nitrogen purging, acetonitrile (559 mL) was added and the mixture was stirred in an oil bath at 70° C. for 40 minutes. Then, butyl acrylate (1.00 kg), diethyl 2,5-dibromoadipate (117 g, 0.325 mol) and pentamethyldiethylenetriamine (1.7 mL, 1.41 g, 8.1 mmol) (hereinafter referred to briefly as triamine) were added and the reaction was thus started. Under heating at 70° C. with stirring, butyl acrylate (4.00 kg) was continuously added dropwise. In the course of dropwise addition of butyl acrylate, triamine (8.5 mL, 7.06 g, 0.041 mol) was supplementally added. At 370 minutes after the start of reaction, 1,7-octadiene (1.57 L, 1.17 kg, 10.65 mol) and triamine (20.4 mL, 16.8 g, 97.2 mol) were added and the reaction mixture was further heated and stirred at 70° C. for 220 minutes.

This reaction mixture was diluted with toluene, passed through an activated alumina column, and the volatile fraction was distilled off under reduced pressure to recover a polymer [1]. This polymer had a number average molecular weight of 21300 and a molecular weight distribution of 1.36.

A 10 L separable flask equipped with a reflux condenser was charged with the above polymer [1] (732 g), potassium benzoate (25.5 g) and N,N-dimethylacetamide (700 ml) and the mixture was heated and stirred in a nitrogen gas stream at 100° C. for 12 hours. After the N,N-dimethylacetamide was removed by heating under reduced pressure, the residue was diluted with toluene. The toluene-insoluble solid fraction (KBr and excess potassium benzoate) was removed by filtration through an activated alumina column. Then, the volatile fraction of the filtrate was distilled off under reduced pressure to give a polymer [2].

A 2 L round-bottom flask equipped with a reflux condenser was charged with the polymer [2] (732 g), aluminum silicate (150 g, Kyowaad 700 PEL, Kyowa Chemical) and toluene (4.0 L) and the mixture was heated and stirred in a nitrogen gas stream at 100° C. for 3 hours. After the aluminum silicate was filtered off, the toluene in the filtrate was distilled off under reduced pressure to give an alkenyl-terminated poly(butyl acrylate) (hereinafter referred to as polymer [3]) This polymer [3] had a number average molecular weight of 21800 and a molecular weight distribution of 1.31. The average number of alkenyl groups introduced per molecule of polymer [3] as determined,by $^1$H NMR was 3.4.

Production Example 2

Synthesis of Acryloyl-terminated poly(butyl acrylate)

A 10 L separable flask equipped with a reflux condenser and stirrer was charged with CuBr (28.0 g, 0.20 mol). After nitrogen purging, acetonitrile (559 mL) was added and the mixture was stirred in an oil bath at 70° C. for 40 minutes. Then, butyl acrylate (1.00 kg), diethyl 2,5-dibromoadipate (117 g, 0.325 mol) and pentamethyldiethylenetriamine (1.7 mL, 1.41 g, 8.1 mmol) (hereinafter referred to briefly as triamine) were added and the reaction was thus started. Under heating at 70° C. with stirring, butyl acrylate (4.00 kg) was continuously added dropwise. In the course of dropwise addition of butyl acrylate, triamine (8.5 mL, 7.06 g, 0.041 mol) was supplementally added.

This reaction mixture was diluted with toluene, passed through an activated alumina column, and the volatile fraction was distilled off under reduced pressure to give a Br-terminated polymer (hereinafter referred to as polymer [4]). This polymer [4] had a number average molecular weight of 19500 and a molecular weight distribution of 1.17.

The above polymer [4] (300 g) was dissolved in N,N-dimethylacetamide (300 ml), followed by addition of potassium acrylate (7.34 g: synthesized by reacting t-butoxypotassium with acrylic acid). The mixture was heated and stirred in a nitrogen stream at 70° C. for 3 hours. The mixture was diluted with 500 ml of toluene and washed with a several portions of warm water. The organic layer was dried over $Na_2SO_4$ and passed through an activated alumina column. Then, the toluene in the filtrate was distilled off under reduced pressure to give an acryloyl-terminated polymer (hereinafter referred to as polymer [5]). This polymer [5] had a number average molecular weight of 20200 and a molecular weight distribution of 1.19. The average number of acryloyl groups introduced per molecule of polymer [5] as determined by $^1$H NMR was 2.1.

Example 1

Preparation of a Composition for Roller and Fabrication of a Roller (1)

To 100 parts of the polymer [3] were added 6.29 parts of α-methylstyrene-modified polyhydroxymethylsiloxane (SiH value 3.70 mmol/g), 15 parts of carbon black (#55G, Asahi Carbon), 1 part of an antioxidant (Irganox 1010, Ciba Specialty Chemicals) and 0.075 ml of platinum(0)-1,1,3,3-tetramethyl-1,3-divinyldisiloxane complex ($1.32\times10^{-4}$ mol/ml; dissolved in xylene), and the mixture was defoamed by stirring under reduced pressure. The viscosity of the resulting composition was 130 Pa·s. This composition was filled into a metal mold having a geometry providing for a layer about 4 mm thick about an 8 mm (dia.) SUS shaft using a liquid injection machine at an injection pressure of 1.0 MPa at room temperature. The metal mold was allowed to sit in an environment of 160° C. for 30 minutes for a curing reaction, whereupon a roller comprised of a semiconductive rubbery elastomer was obtained.

Example 2

Preparation of a Composition for Roller and Fabrication of a Roller (2)

To 100 parts of the polymer [5] were added 15 parts of carbon black (#55G, Asahi Carbon), 0.1 part of p-methoxyphenol (0.5 part as 20% solution in ethyl acetate), and the organic peroxide "Perhexa 3 M (1,1-di-(t-butylperoxy)-3,3,5-trimethylcyclohexane; Nippon Oil and Fat), and after thorough mixing, the mixture was defoamed by stirring under reduced pressure. The viscosity of the resulting composition was 110 Pa·s. This composition was filled into a metal mold having a cavity geometry providing for a layer about 4 mm thick about an 8 mm (dia.) SUS shaft using a liquid injection machine. The metal mold was allowed to sit in an environment of 150 ° C. for 30 minutes for a curing reaction, whereupon a roller comprised of a semiconductive rubbery elastomer was obtained.

The hardness, roller resistance, outer diameter accuracy, and photoreceptor-fouling potential of the rollers obtained in Examples 1 and 2 were evaluated. The results are shown in Table 1.

JIS A hardness was measured in accordance with JIS K6253-1993. Asca-C hardness was measured with an Asca-C rubber hardness meter manufactured by Polymer Instruments Co.

The roller resistance was measured as follows. With a load of 500 g applied to both ends of the shaft (total load: 1 kg), the roller was set on a metal plate and the resistance was measured by applying a DC 100 V current across the shaft-plate.

The outer diameter was measured with a laser OD meter.

The photoreceptor-fouling potential was evaluated as follows. With the OPC (organic photoreceptor) disconnected from a commercial laser beam printer being compressed against the roller by applying a load of 500 g to both ends of the roller (total load: 1 kg), it was allowed to sit in an environmental tester at 40° C.×90% for 7 days. After taking out, the appearance of the OPC was visually inspected. In addition, the OPC was reassembled into the laser beam printer and an image evaluation was carried out.

TABLE 1

| | Hardness | | Roller resistance (Ω) | Out. dia. (mm) | | Photoreceptor | | Tack |
|---|---|---|---|---|---|---|---|---|
| | JIS A | Asca-C | | Mean | Max.-min. difference | Appearance | Image evaluation | |
| Ex. 1 | 14 | 38 | 3.91E + 09 | 16.099 | 0.015 | No fouling | Good[a] | Slight |
| Ex. 2 | 37 | 58 | 1.01E + 06 | 16.116 | 0.012 | No fouling | Good | None |

[a] Good: After return of the OPC to the printer, a hard copy of good image quality was obtained even on the first printout.

It can be seen from Table 1 that the compositions of the above examples gave rollers which are low in hardness and yet with close outer diameter tolerances without being postprocessed. Furthermore, because the compositions are free from unreacted oligomers and low molecular substances, there is no bleeding to foul the photoreceptor and in-process image product. Therefore, when used in the development, charging or transfer step or as a cleaning roller, an extremely high level of reliability is insured.

While the roller resistance values of the rollers according to these examples were $10^6$ Ω~$10^9$ Ω, these resistance values can be controlled by adjusting the grade and addition amount of carbon black or by addition of a dispersant.

Furthermore, by constructing a surface layer of nylon resin, acrylic resin, fluororesin, urethane resin or silicone resin on the surface of the roller, the surface tack can be eliminated and other surface properties also optimized. Thus, through formation of a use-tailored surface layer, these rollers can be adapted to various applications.

Thus, since the acrylic polymer-based compositions according to the above examples are liquid at atmospheric temperature, they are highly workable in the formulation of the conductivity-imparting agent. Moreover, because of their rapid cure feature, these compositions can be easily molded by a liquid injection technique and have good workability. In addition, since the compositions are inherently low in viscosity, it is not necessary to add a non-reactive diluent, plasticizer or the like for reducing viscosity, with the result that the pick-up of fouling matter by the photoreceptor and in-process image product with which the rollers come into contact is precluded even if a surface layer is not coated. Moreover, the rollers are so resistant to heat that, even when used over time as the development roller, transfer roller or charging roller, the rollers feature high reliability without causing an image degradation due to fouling of the photoreceptor or in-process image product.

INDUSTRIAL APPLICABILITY

In accordance with the present invention, there can be obtained a roller made of a semi-conductive rubber-like elastomer predominantly composed of a vinyl polymer having good weather resistance and heat resistance, particularly an acrylic polymer, and featuring no photoreceptor-fouling potential and a long-term reliability. Because of the addition-type curing of the alkenyl-terminated polymer and the radical curing of polymerizable carbon-carbon double bond groups, the cure speed is high with the excellent moldability.

What is claimed is:

1. A composition for roller for an electronic copying machine or printer which comprises a vinyl polymer (A) having at least one alkenyl group per molecule, the main chain of the vinyl polymer (A) being formed by living radical polymerization of a vinyl monomer.

2. The composition for roller according to claim 1, wherein the vinyl polymer (A) has an alkenyl group at a molecular terminal thereof.

3. The composition for roller according to claim 1 wherein the main chain of the vinyl polymer (A) is formed by atom transfer radical polymerization of a vinyl monomer.

4. The composition for roller according to claim 3 wherein the vinyl polymer (A) is formed by
   (1) synthesizing a halogen-terminated vinyl polymer by atom transfer radical polymerization and, then,
   (2) converting said halogen to an alkenyl group containing substitution group.

5. The composition for roller according to claim 1 wherein the main chain of the vinyl polymer (A) is synthesized by polymerizing a (meth)acrylic monomer.

6. The composition for roller according to claim 5 wherein the (meth)acrylic monomer is a (meth)acrylate ester monomer.

7. The composition for roller according to claim 6 wherein the (meth)acrylate ester monomer is an acrylate ester monomer.

8. The composition for roller according to claim 1 wherein the main chain of the vinyl polymer (A) is synthesized by polymerizing a styrenic monomer.

9. The composition for roller according to claim 1 wherein the vinyl polymer (A) has the ratio (Mw/Mn) of weight average molecular weight (Mw) to number average molecular weight (Mn) as determined by gel permeation chromatography of less than 1.8.

10. The composition for roller according to claim 1 wherein the vinyl polymer (A) has a number average molecular weight within the range of 500 to 100,000.

11. The composition for roller according to claim 1 further comprising a curing agent (B) having at least two hydrosilyl groups per molecule and a hydrosilylation catalyst (C).

12. The composition for roller according to claim 1 wherein the alkenyl group is a polymerizable carbon-carbon double bond.

13. The composition for roller according to claim 12 wherein the alkenyl group is represented by the following general formula (1)

$$CH_2=C(R^1)-C(O)O- \qquad (1)$$

wherein $R^1$ represents hydrogen, a methyl group, —CN, or a monovalent hydrocarbon group of 1 to 20 carbon atoms which may optionally contain an oxygen atom.

14. The composition for roller according to claim 12, further comprising a polymerization initiator (D).

15. The composition for roller according to claim 14 wherein the polymerization initiator (D) is a thermal initiator.

16. The composition for roller according to claim 14 wherein the polymerization initiator (D) is a photoradical polymerization initiator.

17. The composition for roller according to claim 14 wherein the polymerization initiator (D) is a photoanionic polymerization initiator.

18. The composition for roller according to claim 1 further comprising a conductivity-imparting compound (E).

19. The composition for roller according to claim 18
   wherein the conductivity-imparting compound (E) is carbon black.

20. The composition for roller according to claim wherein the conductivity-imparting compound (E) is an organic antistatic agent.

21. The composition for roller according to claim 1 wherein the volume resistivity of a roller as obtained is $10^3$ to $10^{10}$ Ω·cm.

22. The composition for roller according to claim 1 wherein the volume resistivity of a roller as obtained is $10^3$ to $10^6$ Ω·cm.

23. The composition for roller according to claim 1
   wherein the volume resistivity of a roller as obtained is $10^7$ to $10^{10}$ Ω·cm.

24. A roller
   which is fabricated using the composition for roller according to claim 1.

25. The roller according to claim 24 which is fabricated by a thermal curing technique.

26. The roller according to claim 24 which is fabricated by a photocuring technique.

27. The roller according to claim 24 which has, on the surface, a protective polymer layer of 30 to 200 μm in thickness.

28. The roller according to claim 27 wherein the protective polymer layer has a resistivity value of $10^7$ to $10^{11}$ Ω·cm.

* * * * *

UNITED STATES PATENT AND TRADEMARK OFFICE
CERTIFICATE OF CORRECTION

PATENT NO.    : 6,660,399 B1  
DATED         : December 9, 2003  
INVENTOR(S)   : Kitano et al.

Page 1 of 1

It is certified that error appears in the above-identified patent and that said Letters Patent is hereby corrected as shown below:

Column 32,  
Line 20, after "monomer" insert -- and a conductivity-imparting compound (E) --.

Column 33,  
Line 1, change "claim 12" to -- claim 13 --.  
Line 12, delete "composition for".  
Line 12, change "claim 1" to -- claim 24 --.  
Line 12, after "1" insert -- wherein the composition --.  
Line 13, change "comprising" to -- comprises --.  
Line 14, change "claim 18" to -- claim 1 --.  
Line 15, change "is" to -- comprises --.  
Line 17, after "claim" insert -- 1 --.  
Line 19, change "is" to -- comprises --.

Column 34,  
Lines 9-10, change "the composition for roller according to claim 1" to -- a composition which comprises a vinyl polymer (A) having at least one alkenyl group per molecule, the main chain of the vinyl polymer (A) being formed by living radical polymerization of a vinyl monomer --.

Signed and Sealed this

Sixteenth Day of May, 2006

JON W. DUDAS  
*Director of the United States Patent and Trademark Office*